L. S. RICH.
LATHE CENTER.
APPLICATION FILED JULY 7, 1908.

1,020,311.

Patented Mar. 12, 1912.

Witnesses
Raymond V. Gilbert
J. J. O'Brien

Inventor
Lyman S. Rich.
By Victor J. Evans
Attorney

UNITED STATES PATENT OFFICE.

LYMAN S. RICH, OF BOSTON, MASSACHUSETTS.

LATHE-CENTER.

1,020,311.  Specification of Letters Patent.  Patented Mar. 12, 1912.

Application filed July 7, 1908. Serial No. 442,275.

*To all whom it may concern:*

Be it known that I, LYMAN S. RICH, a citizen of the United States, residing at Boston, in the county of Suffolk and State of Massachusetts, have invented new and useful Improvements in Lathe-Centers, of which the following is a specification.

This invention relates to lathes and more particularly to a lathe center having a removable tip.

The invention has for one of its objects to provide a comparatively simple, inexpensive and reliable lathe center adapted for live or dead heads of the lathe, provision being made on the centers intended for the dead head spindle for lubricating the work.

Another object of the invention is to so design the center that the body or shank thereof can be used indefinitely while the tips can be renewed as occasion requires.

With these objects in view and others, as will appear as the description proceeds, the invention comprises the various novel features of construction and arrangement of parts which will be more fully described hereinafter and set forth with particularity in the claim appended hereto.

Figure 1:
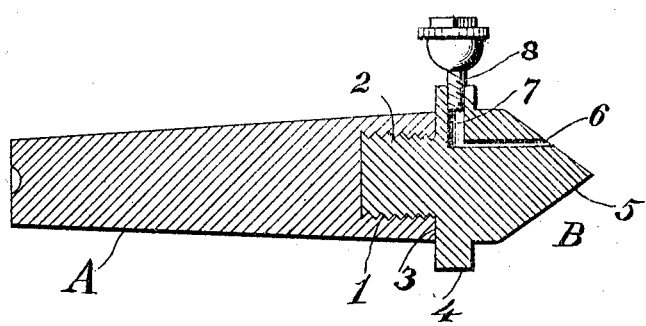
Figure 2:
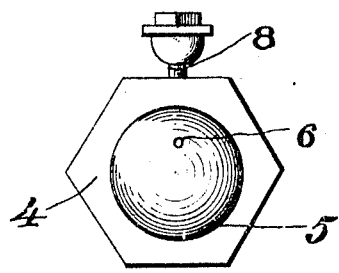

In the accompanying drawing, which illustrates one embodiment of the invention, Figure 1 is a central longitudinal section of the lathe center intended for the dead head. Fig. 2 is an end view.

Similar reference characters are employed to designate corresponding parts throughout both views.

Referring to the drawing, A designates the shank or body of the center which is tapered in one direction so as to fit in the sleeve or spindle of the lathe head, and the larger end of the shank has a central bore 1 that is threaded for receiving the tip B. The tip shown in Fig. 1 is formed with a rearwardly-extending stud 2 that is threaded to screw into the socket 1, and the tip is provided with a shoulder 3 against which the shank bears when the tip is screwed home, and surrounding the tip is a flange 4 which is of larger diameter than the shank and provided peripherally with a gripping surface to receive a wrench for removing or applying the tip. The tip extends outwardly beyond the flange and its work-holding end is of conical shape or formed into a point 5 so as to fit in a center opening in the work. The tip has an L-shaped passage 6 that terminates in the surface of the cone at a suitable distance above the apex thereof, and the inner end of the passage turns upwardly at 7 and opens through said flange for receiving an oil cup 8 of any approved construction. Oil feeds from the cup downwardly into the passage and discharges from the latter on the cone at the top side thereof so as to run down toward the point and lubricate the work. The tips can be used interchangeably and when they become worn or injured, new ones can be substituted without necessitating the scraping of the body of the center.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

It is further noted that the shank may be fitted to either the live or dead spindle of a lathe, and in either position the required work-holding tip may be fitted thereto best adapted for the particular work in hand.

It is further understood that the shank may be of cast or wrought iron and the work-holding tip of tool steel tempered to the desired degree so as to resist wear. It is not necessary to provide a shank for each work holding tip, hence the initial cost of providing a number of different centers is materially reduced and the storage space for keeping the same when not in use is but little.

The work-holding tip comprises a body having essentially three parts, an intermediate annular gripping flange 4, a threaded stud 2 at one end, and a work-holder at the opposite end. The threaded stud 2 is uniform in each tip so as to fit the centrally disposed longitudinally extending threaded socket 1 at the larger end of the shank A. One face of the gripping flange 4 forms a shoulder 3 to limit the inward movement of the tip when screwing the same into the shank A, and it also resists inward movement of the work. It is further of advantage because the lateral portion of the oil duct or passage extends through the upper portion of the flange 4; hence it is elevated and not liable to receive any particles which would tend to clog the opening, and moreover the stem of the oil cup is prevented from being injured by contact of the work therewith. I consider it of especial advantage also to have the oil passage or duct 6 open directly above the apex of the cone 5 rather than through the point thereof or in any other position. If it opened through the apex of the duct 6 it would destroy the point of the tip, but opening where it does it permits the oil to flow onto the face of the cone and down over its apex and around its sides.

Having thus described the invention, what I claim is:—

A lathe center consisting of a shank having terminal screw threads in one end, and a tip having a stem threaded in said screw threads and formed with a conical terminal and an oil duct extending from a point medial of the extremity of the conical terminal and the side of the said tip and having its entrance extending through said side and provided with an oil cup communicating with said entrance.

In testimony whereof I affix my signature in presence of two witnesses.

LYMAN S. RICH.

Witnesses:
W. R. CHIPCHASE,
ROBERT MEARS.